(12) United States Patent
Weber et al.

(10) Patent No.: US 9,168,815 B2
(45) Date of Patent: Oct. 27, 2015

(54) SUPPORT COMPONENT FOR A MOTOR VEHICLE WINDOW LIFTER WITH REINFORCING STRUCTURE

(71) Applicant: Brose Fahrzeugteile GmbH & Co. Kommanditgesellschaft, Hallstadt, Hallstadt (DE)

(72) Inventors: Horst Weber, Wirsberg (DE); Heike Wolf, Bamberg (DE); Kai Müller, Sesslach (DE); Eberhard Pleiss, Schwaigern (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/362,582

(22) PCT Filed: Dec. 4, 2012

(86) PCT No.: PCT/EP2012/005000
§ 371 (c)(1),
(2) Date: Jun. 3, 2014

(87) PCT Pub. No.: WO2013/083265
PCT Pub. Date: Jun. 13, 2013

(65) Prior Publication Data
US 2014/0361575 A1    Dec. 11, 2014

(30) Foreign Application Priority Data
Dec. 9, 2011 (DE) .......................... 10 2011 056 233

(51) Int. Cl.
*E05F 11/48* (2006.01)
*B60J 5/04* (2006.01)
(52) U.S. Cl.
CPC .............. *B60J 5/0422* (2013.01); *B60J 5/0416* (2013.01)

(58) Field of Classification Search
CPC ............... B60J 5/04; B60J 5/00; E05F 11/38; E05F 11/46; E05F 15/08; E05F 15/16
USPC .......................... 49/348, 349, 352; 296/146.6
See application file for complete search history.

(56) References Cited

U.S. PATENT DOCUMENTS 4,494,336 A * 1/1985 Ishii et al. ......................... 49/352
5,535,553 A * 7/1996 Staser et al. ..................... 49/502
(Continued)

FOREIGN PATENT DOCUMENTS

WO    WO 2010/135562 A2    11/2010
WO    WO 2012/162810 A1    12/2012

OTHER PUBLICATIONS

English translation of the International Preliminary Report on Patentability for International Application No. PCT/EP2012/005000, dated Jun. 10, 2014, 8 sheets.
(Continued)

*Primary Examiner* — Jerry Redman
(74) *Attorney, Agent, or Firm* — Christie, Parker & Hale, LLP

(57) ABSTRACT

A support component for a motor vehicle, in particular for a motor vehicle door is provided. The support component defines a support plane and defines two opposed side faces for the arrangement of functional components of a motor vehicle window lifter, wherein the support component includes at least one reinforcing structure for reinforcing the support component, wherein the support component forms at least two surface segments which on both side faces are arranged in the direction of extension along the support plane. The reinforcing structure is formed such that on the one side face it extends in a manner protruding with respect to both surface segments transversely to the support plane and on the other side face extends in a manner set back with respect to a surface segment of the two surface segments and protruding with respect to the other surface segment of the two surface segments.

14 Claims, 9 Drawing Sheets

(56) References Cited

U.S. PATENT DOCUMENTS

| | | | |
|---|---|---|---|
| 6,516,493 B1* | 2/2003 | Seliger et al. | 16/96 R |
| 6,536,164 B1* | 3/2003 | Kirejczyk | 49/502 |
| 6,663,169 B2* | 12/2003 | Gehringhoff et al. | 296/187.12 |
| 6,874,279 B1* | 4/2005 | Weber et al. | 49/352 |
| 7,793,464 B2* | 9/2010 | Bucker et al. | 49/502 |
| 8,065,837 B2* | 11/2011 | Nakajima | 49/502 |
| 8,631,607 B2* | 1/2014 | Broadhead et al. | 49/352 |
| 8,844,198 B2* | 9/2014 | Raisoni et al. | 49/352 |
| 8,851,553 B2* | 10/2014 | Rakei | 296/146.6 |
| 8,910,999 B2* | 12/2014 | Schurter et al. | 296/146.5 |
| 2002/0046498 A1* | 4/2002 | Cardine | 49/352 |
| 2002/0171260 A1* | 11/2002 | Schneider | 296/146.6 |
| 2004/0150249 A1* | 8/2004 | Gehringhoff et al. | 296/146.6 |
| 2004/0163320 A1* | 8/2004 | Kirejczyk | 49/352 |
| 2004/0237410 A1* | 12/2004 | Cardine et al. | 49/352 |
| 2005/0016071 A1* | 1/2005 | Takeda et al. | 49/352 |
| 2007/0251149 A1* | 11/2007 | Kirejczyk et al. | 49/352 |
| 2009/0145035 A1* | 6/2009 | Mangold et al. | 49/352 |
| 2011/0078957 A1* | 4/2011 | Deschner | 49/352 |
| 2011/0308163 A1* | 12/2011 | Roy et al. | 49/352 |
| 2013/0160371 A1* | 6/2013 | Hayotte | 49/352 |
| 2014/0102007 A1* | 4/2014 | Pavlovic et al. | 49/352 |

OTHER PUBLICATIONS

International Search Report, corresponding to PCT/EP2012/00500, dated Mar. 28, 2013, 4 pages.

* cited by examiner

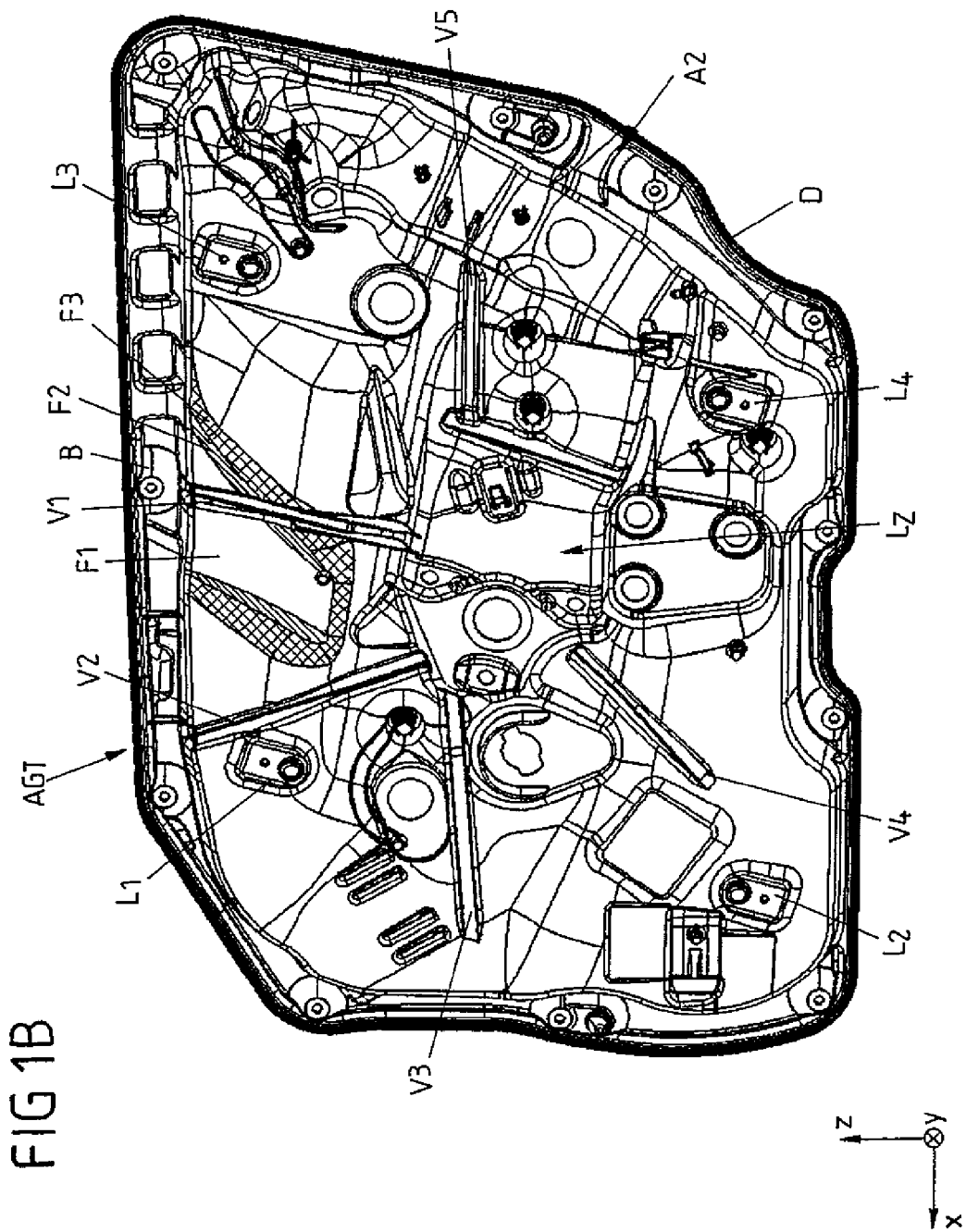

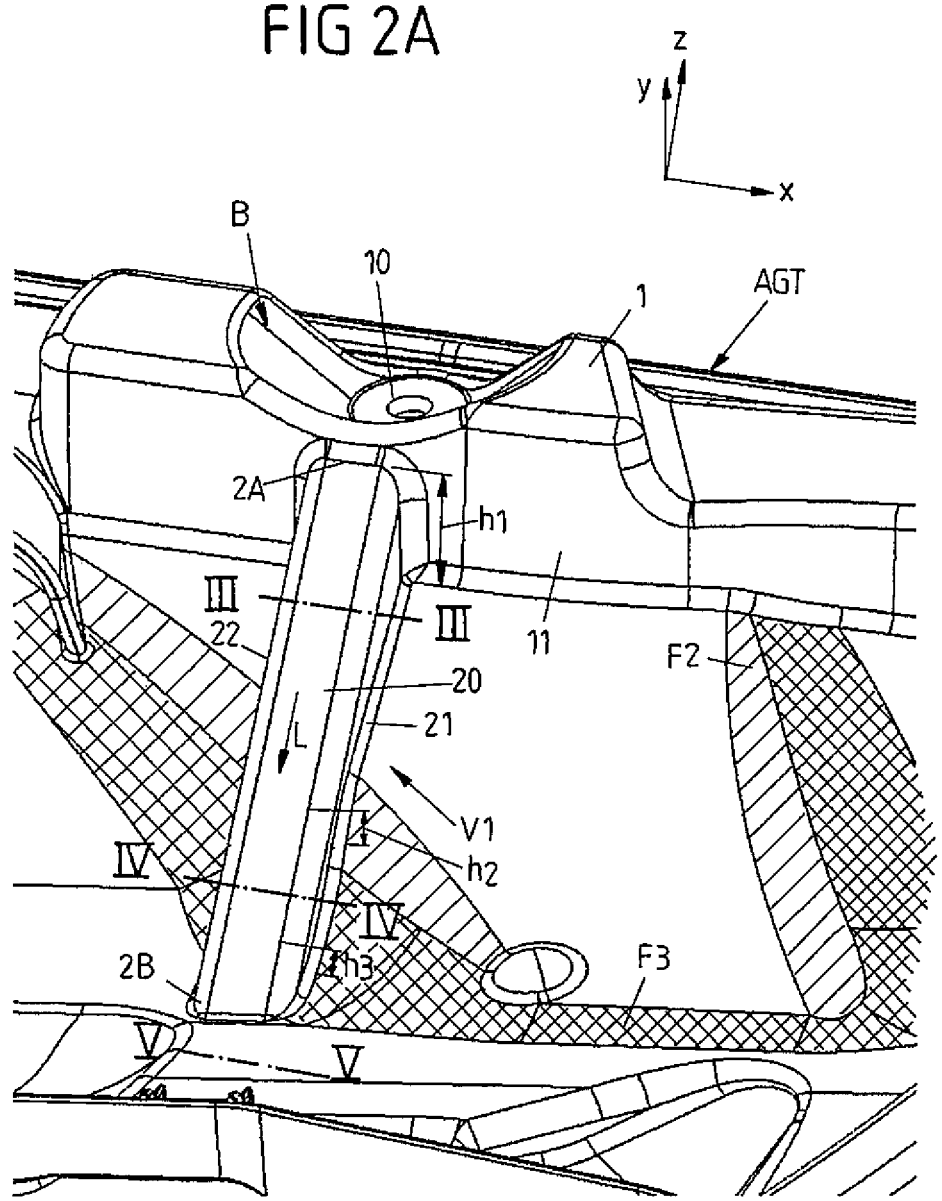

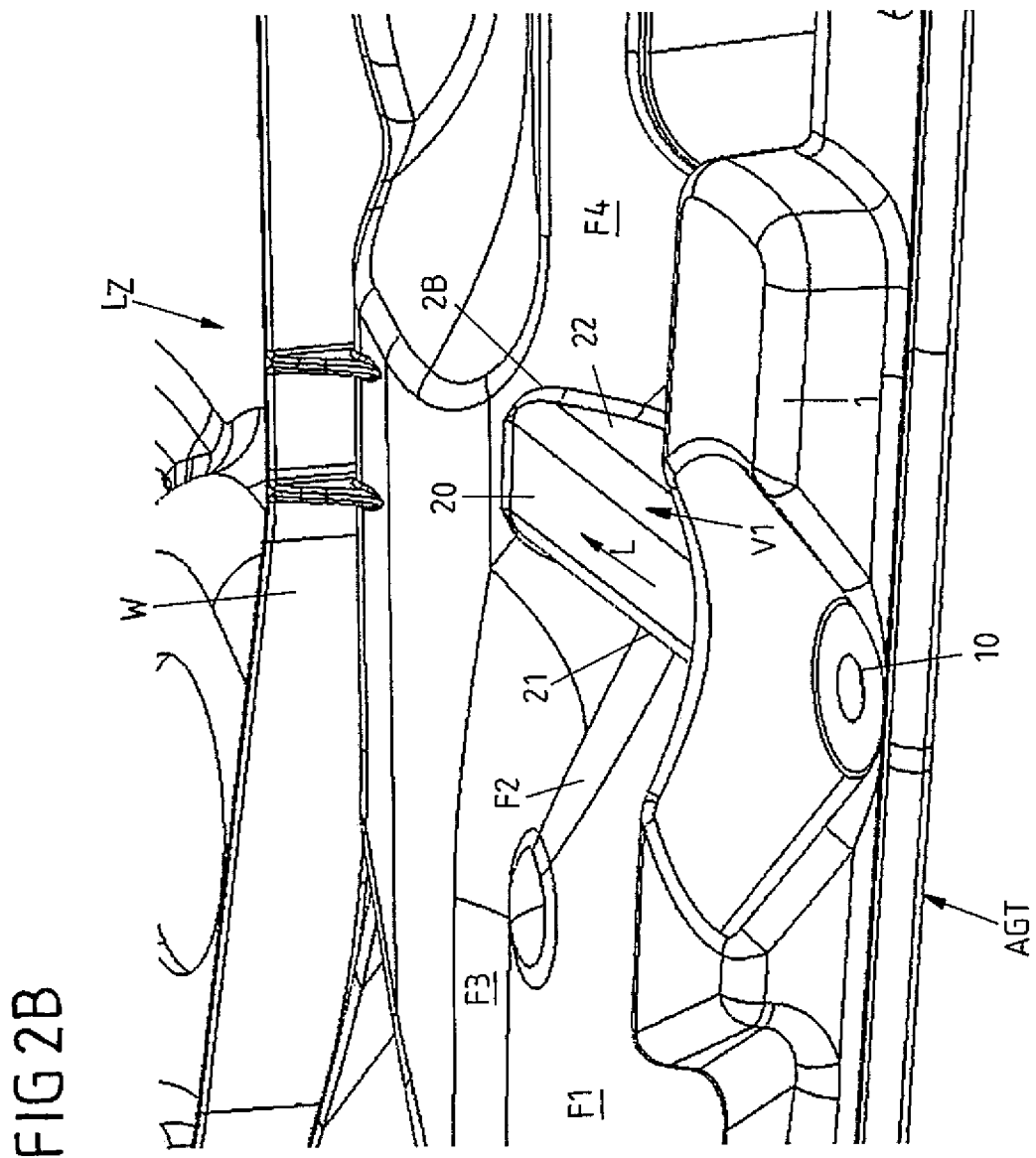

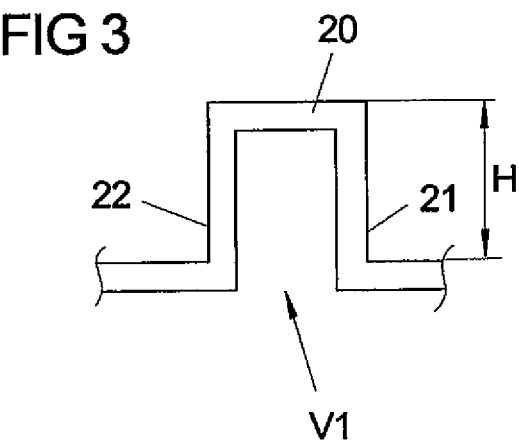
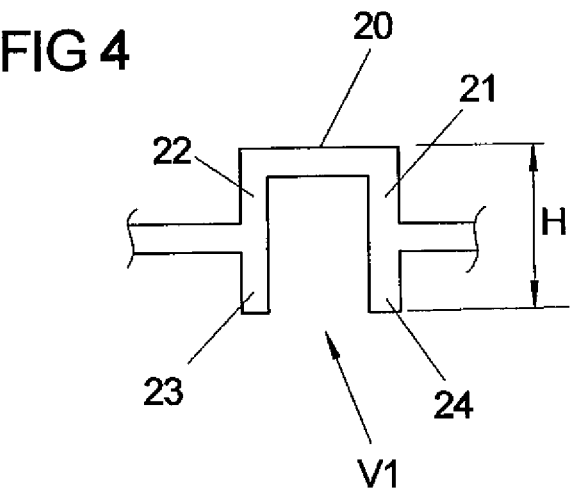
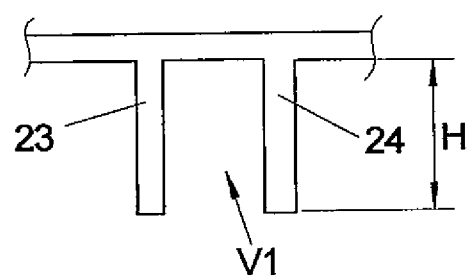

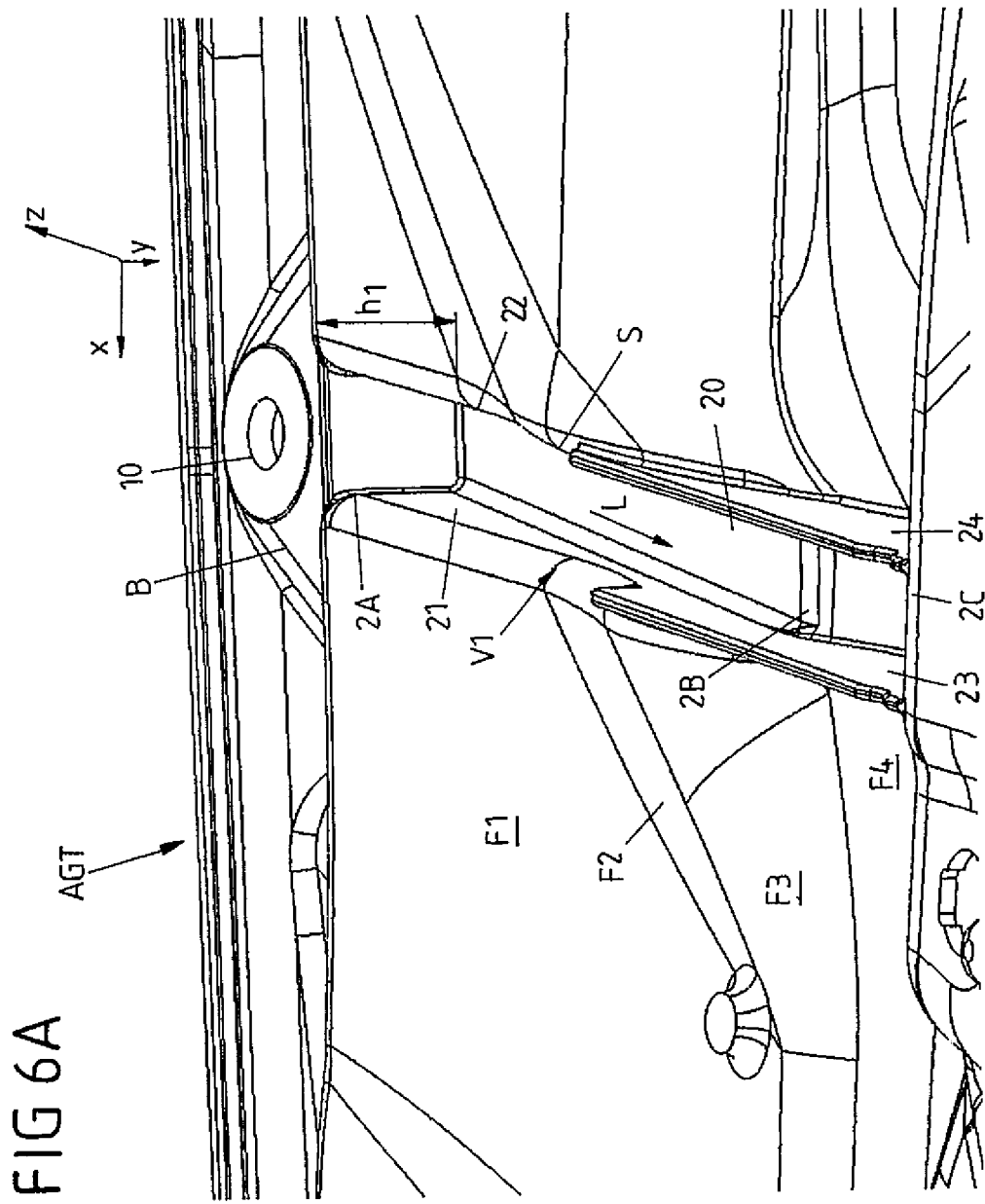

SUPPORT COMPONENT FOR A MOTOR VEHICLE WINDOW LIFTER WITH REINFORCING STRUCTURE

CROSS-REFERENCE TO A RELATED APPLICATION

This application is a National Phase Patent Application of International Patent Application Number PCT/EP2012/005000, filed on Dec. 4, 2012, which claims priority of German Patent Application Number 10 2011 056 233.8, filed on Dec. 9, 2011.

BACKGROUND

The present invention relates to a support component for a motor vehicle.

Such support component extends in a planar manner along a support plane and is formed and provided for carrying functional components of a motor vehicle window lifter, such as for example a guide rail and/or a drive motor for adjusting the window pane. For example, this is a so-called assembly carrier which is inserted into a motor vehicle door. The planar support component defines two opposed side faces for the arrangement of the functional components, of which in the case of an assembly carrier the one faces a door outer skin and the other one faces the vehicle interior space, when the assembly carrier is properly mounted in the motor vehicle door.

Such planar support component usually has a comparatively small thickness relative to its expansion along the support plane, so that the support component regularly includes a reinforcing structure or several reinforcing structures, in order to reinforce the support component and in particular design the same with a greater flexural and torsional rigidity. For this purpose it is known to provide for example ribs or beads as reinforcing structures at the support component.

For the large-surface reinforcement, beads preferably are used, since the same provide a greater increase in the moment of resistance due to the profile formed. For the local reinforcement ribs in turn are preferably used, since as compared to beads the same lead to a smaller increase in the moment of resistance.

For reasons of installation space it now often is required that on one side face there must be provided surface segments offset to each other in their height, which form the side face. Such surface segments are locally limited and not suitable for the selective reinforcement of the support component. But when a reinforcing structure extends over two surface segments offset to each other in their height, it can occur that the reinforcing structure represented as bead on one side face and as longitudinally extending elevation protruding in a relief-like manner on the other side face has no or not the desired reinforcing effect. At least one surface segment extends to the other surface segment at a different height relative to the support plane defined by the support component at the respective side face. Due to the change of the reinforcing structure along its direction of longitudinal extension from the one (e.g. lower) surface segment to the other (higher) surface segment, it can be the case for example with a bead that the bead cannot be continued at the higher surface segment, without the rigidity at the transition between the two surface segments being reduced thereby in addition. Therefore, at the surface segment offset with respect to its height only the wall thickness of the support component regularly is available.

For example, on a first side face a first surface segment can protrude more raised with respect to the support plane than an adjoining second surface segment, wherein a reinforcing structure protruding in a relief-like manner extends over both surface segments. On the opposed second side face this reinforcing structure is represented as bead which extends as channel-like depression from the first surface segment which here, i.e. at the second side face, is located at a lower level or set back with respect to the second surface segment represented (more) raised on the second side face. On the second side face, however, the second surface segment now can be elevated with respect to the first surface segment to such an extent that the longitudinally extending depression shallows out thereby and opens directly into the second surface segment. Thus, in the region of the second surface segment there is no more effective reinforcement by the reinforcing structure.

SUMMARY

Proceeding from this problem it is an object underlying the present invention to further improve a support component for a motor vehicle window lifter and in particular minimize the aforementioned disadvantages.

The support component according to an exemplary embodiment of the invention is characterized by a reinforcing structure which on both opposed side faces of the planar support component at least partly extends over two surface segments—possibly arranged one behind the other and offset to each other—and is formed such that the reinforcing structure on the one side face extends in a manner protruding with respect to both surface segments transversely to the support plane and on the other side face extends in a manner set back with respect to the one surface segment and protruding with respect to the other surface segment.

In this way it is ensured that even with surface segments arranged offset to each other the reinforcing structure is continued with reinforcing effect and the reinforcing structure formed on the other side face in a manner set back—for example as bead—does not without substitute open into a higher surface segment or a surface segment raised with respect to the other surface segment. It is preferred, for example, to form the reinforcing structure with a combination of bead and at least one reinforcing rib. The reinforcing rib in particular can adjoin the bead as an extension of a side wall of the bead along a direction of longitudinal extension and can protrude in the form of a thin wall substantially vertically to the support plane at the respective side face.

In the case of surface segments arranged offset to each other transversely to the support plane defined by the support component, at least one (first) surface segment is set back with respect to at least one other (second) surface segment relative to the support plane, i.e. on one side face the other (second) surface segment is located at a lower level than the one (first) surface segment or the one (first) surface segment extends at least slightly elevated or is raised with respect to the other (second) surface segment.

For benefiting from the advantages of the solution according to the invention it is, however, not absolutely necessary that the reinforcing structure on both side faces at least partly extends over two surface segments arranged one behind the other and offset to each other in the direction of extension of the reinforcing structure. It rather can also be provided that the two surface segments substantially extend in a common plane, e.g. the support plane.

In a preferred design variant, the expansion of the reinforcing structure changes along its direction of extension—preferably continuously transversely to the support plane defined by the support component. The reinforcing structure can extend in a ramp-like manner in at least a portion on one or both side faces.

In an advantageous development it is provided that the expansion of the reinforcing structure transversely to the support plane and along the direction of extension changes to a corresponding extent on both side faces, so that an expansion of the reinforcing structure transversely to the support plane decreases or increases on the one side face to the extent in which the expansion of the reinforcing structure transversely to the support plane also decreases or increases on the other side face. In an exemplary embodiment based thereon the reinforcing structure on the one side face for example extends as channel-like or ramp-like depression, i.e. for example as bead with continuously decreasing depth, while the reinforcing structure on the opposed side face (continuously) protrudes in a relief-like and/or wedge-shaped manner along a direction of longitudinal extension, so that it here likewise has a portion extending in a ramp-like manner.

On the same side face, the portion of the reinforcing structure formed as bead for example is adjoined by at least one reinforcing rib or a pair of reinforcing ribs in direction of longitudinal extension of the reinforcing structure. In the (second) surface segment adjoining in direction of longitudinal extension, which is raised or elevated with respect to a (first) surface segment on the one side face, the reinforcing structure thereby extends in a protruding manner and also acts as reinforcement in this region of the support component. On one side face, the reinforcing structure thus merges from a portion formed by a depression into a protruding portion, in order to effectively reinforce the support component also at mutually offset surface segments of the side face.

For example, a decreasing expansion of the reinforcing structure transversely to the support plane on the one side face can be compensated by an increasing expansion of the reinforcing structure transversely to the support plane and/or transversely to the direction of extension (and along the support plane) on the other side face. In this connection it can be provided, for example, that the reinforcing structure has an overall height vertical to the support plane remaining substantially constant along its direction of extension and is formed such that along its direction of extension it protrudes from the two side faces to a differently strong extent, in order to achieve a substantially constant reinforcing effect along its direction of extension.

In accordance with the above-mentioned exemplary embodiment, the height and/or the width of a reinforcing rib for example can also be increased on the one side face, when the height of the portion of the reinforcing structure protruding on the other side face and located opposite the reinforcing rib is reduced. The increase of the width and/or the height of the reinforcing rib along the direction of extension on the one side face tends to be effected to the extent in which the expansion on the other side face decreases along the direction of extension, in order to achieve a substantially constant reinforcing effect of the reinforcing structure along its direction of extension.

The reinforcing structure preferably extends on both side faces defined by the support component from an edge region of the support component in direction of a middle or central portion of the support component. The middle or central portion of the support component for example can be a bearing surface of the support component, which is formed and provided for the purpose that a drive unit of the motor vehicle window lifter with a drive motor is fixed at the same.

In an exemplary embodiment, the two surface segments which are reinforced by one and the same reinforcing structure on the two opposed side faces of the support component are connected with each other via at least one further, third surface segment, across which the reinforcing structure extends. This third surface segment connects the two first and second surface segments—possibly offset to each other transversely to the support plane—with each other and for example at least partly or fully extends with an inclination to the two surface segments connected thereby and/or to the support plane of the support component.

Due to the reinforcing structure at least partly extending on two surface segments offset to each other in the manner according to the invention, a continuous reinforcing effect is achieved, even if the two surface segments adjoining each other or located one behind the other at least along the direction of longitudinal extension of the reinforcing structure protrude from a side face of the support component or are formed set back to a differently strong extent. Predetermined bending points also are avoided in those regions in which a transition from the one surface segment to the other, higher or lower surface segment is effected, since the reinforcing structure selectively is continued along its direction of extension.

In addition, a gain in installation space also can be achieved, since possible reinforcing measures at constrictions on a side face are realized by the reinforcing structure on the same surface segment on the other side face facing away from the constriction. For example, when no sufficient installation space for a raised protruding reinforcing structure is available on the one side face of the one surface segment, it is ensured by the formation of the support component according to the invention that the reinforcing structure is continued on the opposed side face and the reinforcing structure in the further course now protrudes in a raised manner on the other, opposed side face, in order to achieve a reinforcing effect, and is continued e.g. as reinforcing rib.

BRIEF DESCRIPTION OF THE DRAWINGS

Further features and advantages of the present invention will become apparent from the following description of an exemplary embodiment with reference to the Figures.

FIGS. 1A-1B show an exemplary embodiment of a support component according to the invention in different side views.

FIGS. 2A-2C show different perspective and enlarged views of the support component looking at a reinforcing structure on a first side face of the support component.

FIGS. 3, 4 and 5 partly show different sectional views of the support component according to the sectional lines III, IV and V indicated in FIG. 2A.

FIGS. 6A-6C show different perspective and enlarged views of the support component with the reinforcing structure of FIGS. 2A to 2C looking at a second side face of the support component opposite the first side face.

DETAILED DESCRIPTION

Figure 1A:
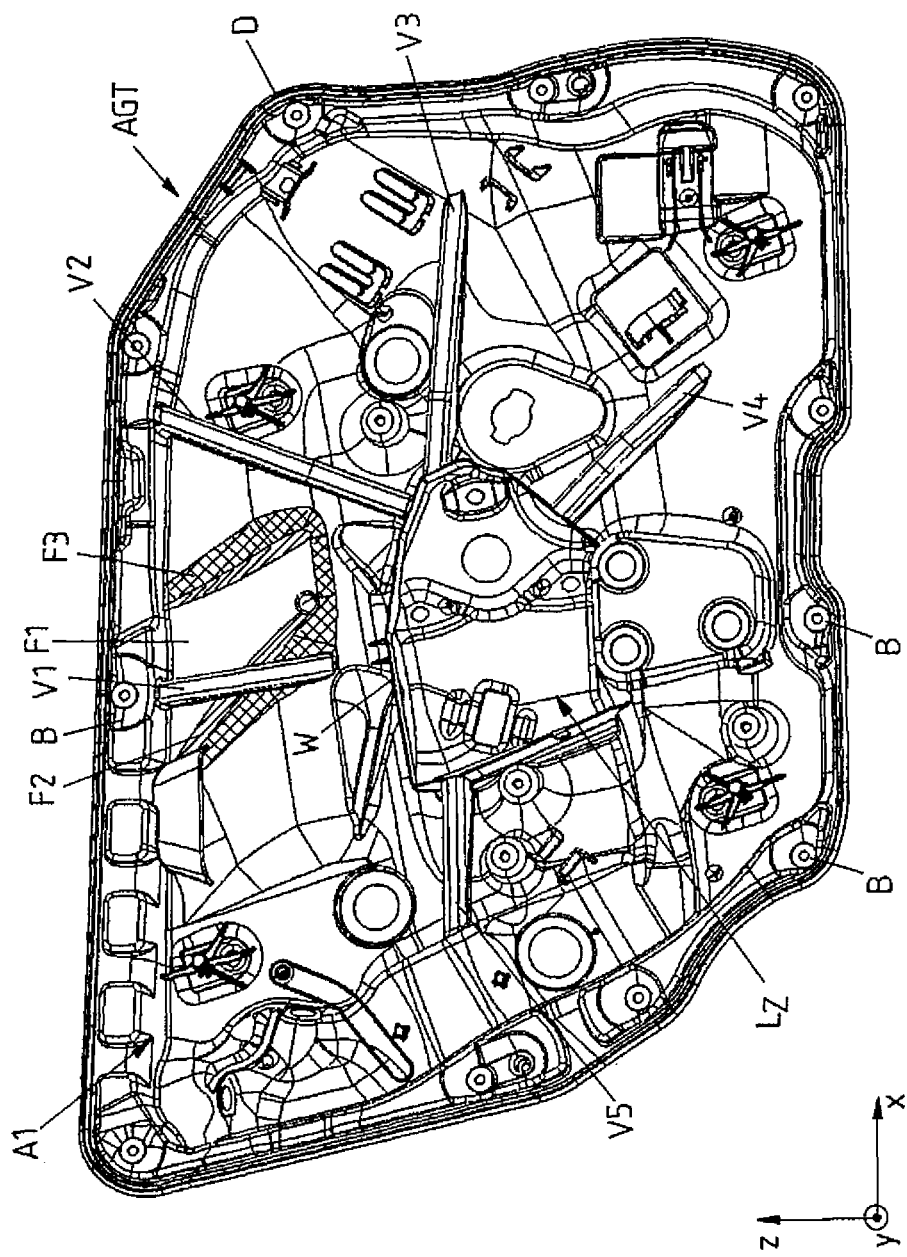

FIG. 1A shows a planar support component in the form of an assembly carrier AGT in a side view looking at a first side face 1A of the assembly carrier. At the assembly carrier, functional components of a motor vehicle window lifter can be arranged and fixed at bearing surfaces $L_1$ to $L_4$ provided for this purpose (see also FIG. 1B).

The assembly carrier AGT furthermore serves for sealingly closing a cavity inside a motor vehicle door, so that in the motor vehicle door a wet space present between a door outer side and the assembly carrier AGT is sealed with respect to a dry space of the vehicle door located in direction of the vehicle interior space. At its edge, the assembly carrier AGT therefore has a circumferential seal D, via which the assembly carrier AGT can sealingly be mounted on a door inner skin, in order to separate a wet space from a dry space inside the motor vehicle door. In regions of the assembly carrier AGT close to the edge a plurality of fixing points B are provided, at which the assembly carrier AGT can be fixed at the door inner skin.

The assembly carrier AGT here extends in a planar manner substantially along a support plane which is defined by the assembly carrier AGT in the directions in space x and z. The support plane corresponding with the xz-plane thus represents a reference plane, with respect to which the regions formed at the assembly carrier AGT can protrude or be set back.

The assembly carrier AGT is made of a comparatively thin-walled material and for reinforcement is provided with a plurality of reinforcing structures V1 to V5. On the first side face A1 of the assembly carrier AGT as shown in FIG. 1A, which in the mounted condition of the assembly carrier AGT in a motor vehicle faces the vehicle interior space, the individual reinforcing structures V1 to V5 protrude in a relief-like raised manner relative to the support plane (xz-plane) defined by the assembly carrier AGT. The individual reinforcing structures V1 to V5 furthermore are formed to be each longitudinally extended and each extend from an edge region of the assembly carrier AGT towards a central bearing surface $L_z$ of the assembly carrier AGT. At this central bearing surface $L_z$, a drive unit with a drive motor for the motor vehicle window lifter can properly be mounted and fixed. The reinforcing structures V1 to V5 thus extend radially from an edge region of the assembly carrier AGT towards this central bearing surface $L_z$.

In the present case, individual structures of the longitudinally extending reinforcing structures V1 to V5 partly or completely extend across several adjacent surface segments on the first side face A1, so that in the region of these surface segments of the assembly carrier AGT the reinforcing structures V1 to V5 increase a moment of resistance of the assembly carrier AGT against bending and torsion. Adjacent surface segments on the first side face A1 can be present at different height levels relative to the support plane. Individual adjacent surface segments of the assembly carrier AGT thus are present on the first side face A1 at a higher or lower level or are set back or raised with respect to an adjacent surface segment.

For example, surface segments F1 to F4 of the assembly carrier AGT are located one behind the other along a direction in the support plane (xz-plane) and are at least partly offset to each other transversely to the support plane. In the present case, for example, the surface segment designated with F3 is set back or depressed with respect to a planar surface segment F1 on the first side face A1 and surrounds the (first) surface segment F1 in a U-shaped manner. The two surface segments F1 and F3 partly are connected with each other via a surface segment F2 extending with an inclination to the two surface segments F1 and F3 and with an inclination to the support plane.

On the first side face A1, the one fixing structure V1 extends proceeding from a fixing point B in direction of the central bearing surface $L_z$ across portions of all three surface segments F1, F2 and F3. The reinforcing structure V1 extends in a ramp-shaped manner proceeding from the fixing point B formed at the edge region of the assembly carrier AGT, so that the reinforcing structure V1 chiefly tapers along its direction of (longitudinal) extension L towards the central bearing surface $L_z$ transversely to the support plane. The expansion of the reinforcing structure V1 protruding on the first side face A1 thus decreases along its direction of longitudinal extension. This is also reflected by a continuously decreasing height of the reinforcing structure V1 along its direction of longitudinal extension L on the first side face A1 relative to the respectively adjacent surface segment F1, F2 or F3, as is illustrated in FIG. 2A in an enlarged view with the heights $h_1$, $h_2$ and $h_3$ ($h_1 > h_2 > h_3$).

In FIG. 1B, the assembly carrier AGT is shown looking at a second side face A2, which is located opposite the first side face A1 of FIG. 1A and which in the mounted condition of the assembly carrier AGT faces the door outer skin and the wet space. On the second side face A2, guide rails of the motor vehicle window lifter each can be fixed in the region of a pair of bearing surfaces $L_1$, $L_2$ or $L_3$, $L_4$.

On the second side face A2, proceeding from the fixing point B, the reinforcing structure V1 extends as a channel-like depression across portions of the three surface segments F1 to F3. On the second side face A2, the reinforcing structure V1 thus is represented as bead in the assembly carrier AGT, which proceeding from the first surface segment F1 extends along its direction of longitudinal extension L. The bead of the reinforcing structure V1 on the second side face A2 likewise extends in a ramp-like manner along its direction of longitudinal extension L, so that in the course of the reinforcing structure V1 the depth of the bead decreases towards the central bearing surface $L_z$.

In reinforcing structures known so far, this course however would lead to the fact that in the region of the third surface segment F3, at which the bead ends, the reinforcing structure V1 also would end, as on the second side face A2 this surface segment F3 is elevated or raised with respect to the first surface segment F1 to such an extent that the bead no longer can be continued (so as to reinforce the assembly carrier AGT). The surface segment F3 and a surface segment F4 adjoining the same in direction of longitudinal extension L of the reinforcing structure V1 correspondingly would no longer be reinforced by the reinforcing structure. Rather, in the transition region between the surface segments F3 and F4, in which the reinforcing structure ends, an undesired bending point would be incorporated in the assembly carrier AGT. Thus, the thin-walled assembly carrier AGT possibly might fail under a bending and/or torsional load exactly in this transition region.

To counteract such disadvantageous design of a reinforcing structure, the reinforcing structure V1 on the second side face A2 is continued according to the invention, namely such that in the further course along its direction of longitudinal extension L it extends in a manner protruding from the second side face A2, here in the form of a pair of reinforcing ribs 23, 24 parallel to each other. On the second side face A2, the reinforcing structure V1 thus merges from a portion set back into a raised protruding portion along its direction of longitudinal extension L.

This is illustrated above all in the synopsis of FIGS. 2A to 2C, 3 to 5, and 6A to 6C.

Figure 2C:
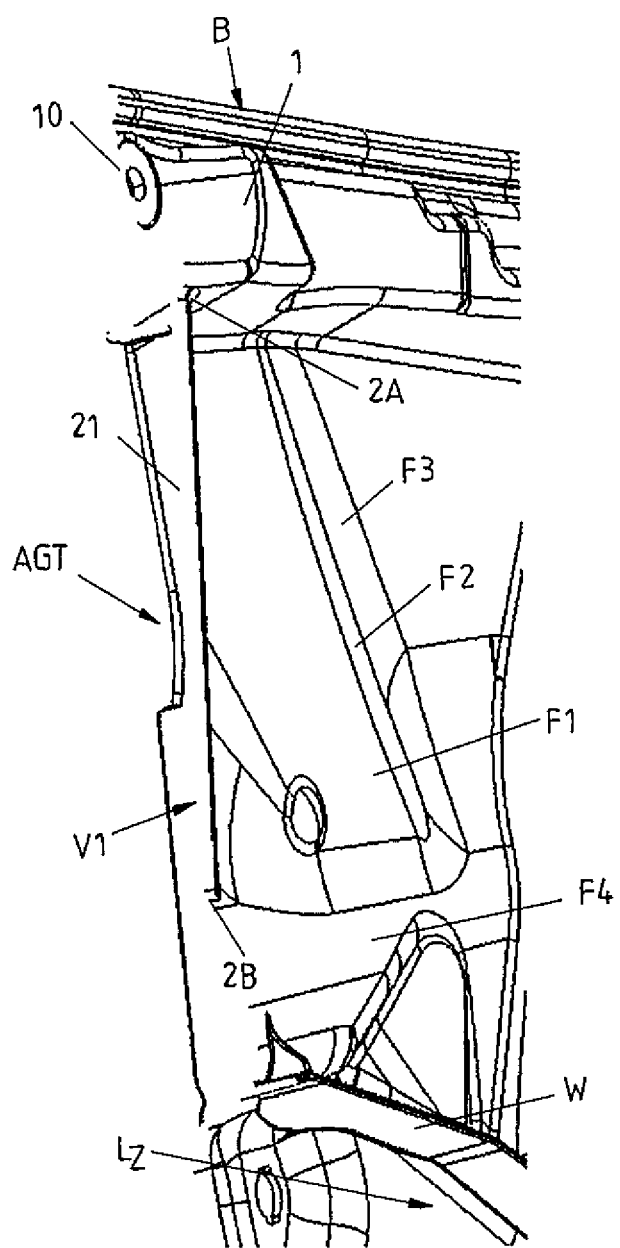
Figure 6B:
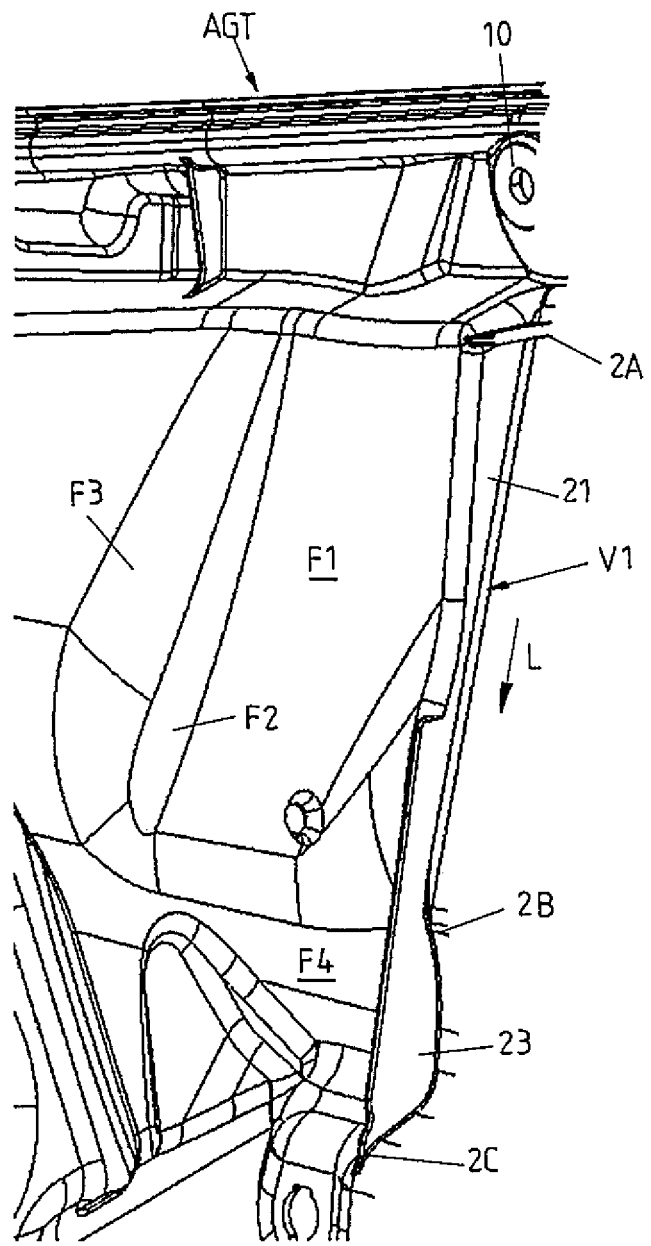
Figure 6C:
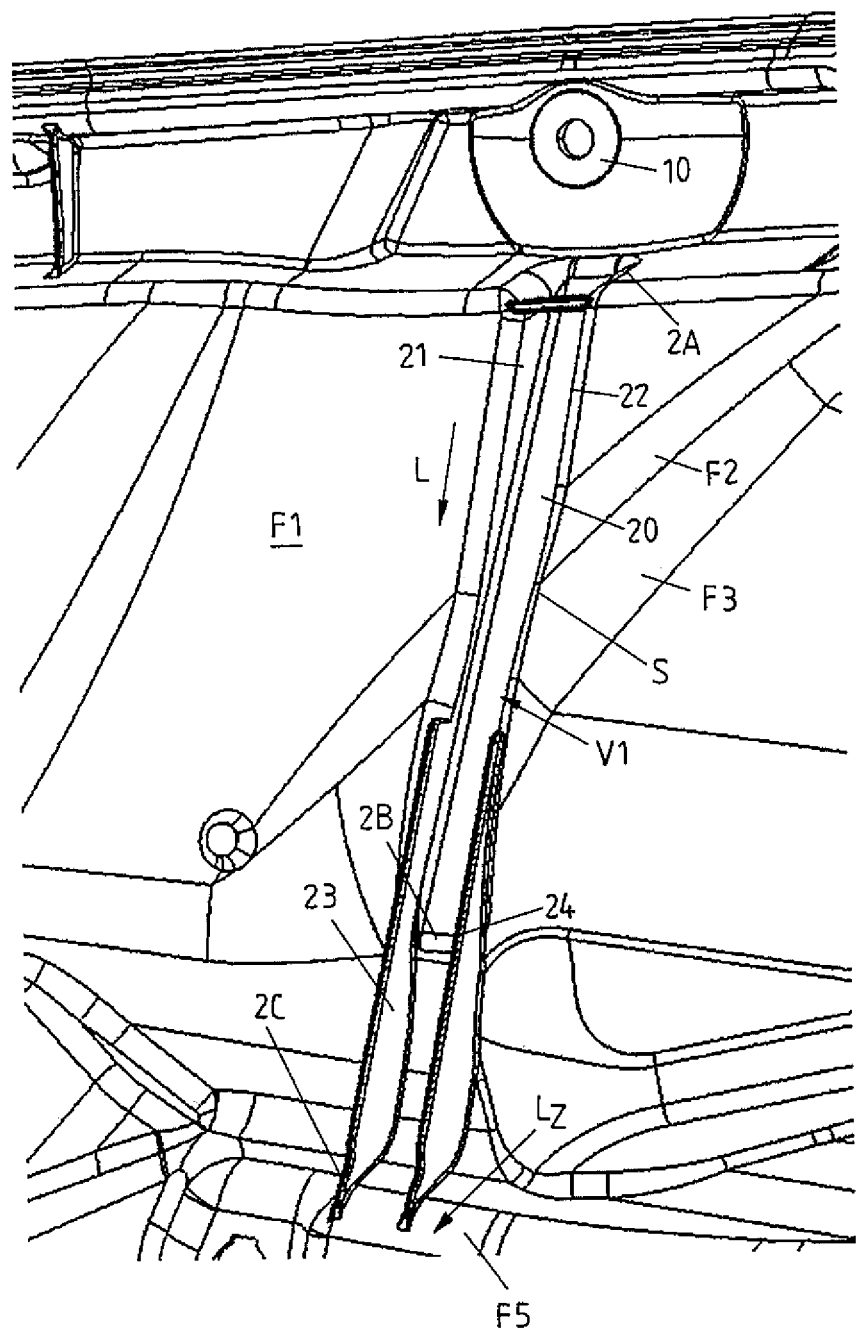

FIGS. 2A, 2B and 2C show enlarged, perspective views of the first side face A1 of the assembly carrier AGT with the relief-like and raised protruding reinforcing structure V1, whereas FIGS. 3, 4 and 5 show sectional views along the sectional lines III, IV and V indicated in FIG. 2A. FIGS. 6A, 6B and 6C in turn show the second side face A2 of the assembly carrier AGT, on which the reinforcing structure V1 initially is formed in the form of a bead S and in the further course along its direction of longitudinal extension L in the form of the two reinforcing ribs 23, 24 parallel to each other and protruding from the second side face A2.

As explained already, proceeding from an edge region of the assembly carrier AGT with a fixing point B the reinforcing structure V1 extends along the direction of longitudinal extension L in direction of a central bearing surface $L_z$. The fixing point B here is formed in the form of a fixing dome 1 which includes a bore 10 for fixing the assembly carrier AGT at a door inner skin. At a dome wall 11 protruding from the first side face A1 substantially vertically to the support plane a first portion of the reinforcing structure V1 starts, which proceeding from a portion end 2A at this dome wall 11 on the first side face A1 extends in a wedge-shaped manner across the three surface segments F1, F2 and F3 to a portion end 2B in the region of the further surface segment F4. On the first side face A1, the reinforcing structure V1 thus forms a ramp-like surface or base 20, which is connected with the surface segments F1 to F3 via two side walls 21, 22 extending substantially vertically thereto and aligned parallel to each other. Via the side walls 21, 22 tapering along the direction of longitudinal extension L of the reinforcing structure V1 on the first side face A1, the reinforcing structure V1 and in particular the base 20 thus protrudes in a raised manner and thus extends in a manner protruding from the first side face A1, so that it reinforces the assembly carrier AGT in the region of the surface segments F1 to F3.

To the extent in which the expansion of the reinforcing structure V1 on the first side face A1 decreases in the course of its direction of longitudinal extension L, the expansion of the reinforcing structure V1 on the opposed second side face A1 also decreases. Correspondingly, the bead S in the region of the portion end 2A at the fixing dome 1 is present with a depth $h_1$ which corresponds to the height $h_1$ with which the reinforcing structure V1 on the first side face A1 protrudes from the surface segment F1 in the region of the fixing dome 1.

To prevent the formation of an undesired predetermined bending point in the region of the further portion end 2B of the reinforcing structure V1 on the first side face A1, at which the reinforcing structure V1 on the first side face A1 opens into the surface segment F4, but to achieve a reinforcement of the assembly carrier AGT also in the region of the surface segment F4, the reinforcing structure V1 on the second side face A2 includes two reinforcing ribs 23, 24 adjoining directly in direction of longitudinal extension L in addition to the bead S. The bead S of the reinforcing structure V1 thus is is combined with at least one protruding reinforcing rib, here a pair of reinforcing ribs 23, 24, in order to achieve a continuous reinforcing measure. The two side walls 21, 22 of the reinforcing structure V1, which on the second side face A2 form the lower walls of the bead S, correspondingly each merge into a reinforcing rib 23, 24 which in the region of the surface segments F3 and F4 protrudes in a raised manner from the second side face A2 of the assembly carrier AGT.

In direction of extension L, the reinforcing ribs 23, 24 end at a (third) portion end 2C in a surface segment F5 which protrudes from the second side face A2 in a raised manner and is part of the central bearing surface $L_z$. This surface segment F5 is located in the region of a wall W which on the opposed first side face A1 protrudes substantially vertically to the support plane and surrounds the central bearing surface $L_z$ for the drive unit of the window lifter.

As can be taken from the sectional representations of FIGS. 3, 4 and 5, the reinforcing structure V1 forms portions protruding from both side faces A1, A2 to a differently strong extent along its direction of longitudinal extension L for reinforcing the assembly carrier AGT in the region of the surface segments F1 to F4 offset to each other and arranged one behind the other or succeeding each other along the direction of longitudinal extension L. In a first portion, the reinforcing structure V1 corresponding to FIG. 3 protrudes in a raised manner only from the first side face A1 and on the opposed, second side face A2 exclusively is represented as channel-like depression or bead S. In the further course of the direction of longitudinal extension L—here in the region of the surface segment F3 which, each relative to the support plane on which the first side face A1 is located at a lower level than the two surface segments F1 and F2 and on the second side face at a higher level than the two surface segments F1 and F2—the reinforcing structure V1 on the second side face A2 additionally forms raised protruding portions in the form of the reinforcing ribs 23, 24. For additional reinforcement, the reinforcing ribs 23, 24 protrude from the second side face A2, in order to compensate the reduced reinforcement due to the decreasing depth of the bead S. This is shown in essence in the sectional representation of FIG. 4. In a portion of the reinforcing structure V1 furthermore adjoining in direction of longitudinal extension L, the same only extends on the second side face A2, namely in the form of the continued protruding reinforcing ribs 23, 24, as is shown in particular in FIG. 5. Via these reinforcing ribs 23, 24, the surface segment F4 thus is reinforced, into which the portion of the reinforcing structure V1 protruding from the first side face A1 opens.

In the present case, the expansion of the reinforcing structure V1 transversely to the support plane (xz-plane) and along the direction of longitudinal extension L changes to a corresponding extent on both side faces A1, A2, so that along the direction of longitudinal extension L an expansion of the reinforcing structure V1 transversely to the support plane (xz-plane) decreases on the one side face A1 to the extent in which the expansion of the reinforcing structure V1 transversely to the support plane (xz-plane) increases on the other side face A2. Along its direction of longitudinal extension L, the reinforcing structure V1 here has an overall height H remaining constant substantially vertically to the support plane and is formed such that along its direction of longitudinal extension L it protrudes from the two side faces A1, A2 to a differently strong extent. In this way, a substantially constant reinforcing effect is achieved along the direction of longitudinal extension L of the reinforcing structure and a decreasing expansion transversely to the support plane (xz-plane) on the one side face A1 is compensated by an increasing expansion transversely to the support plane (xz-plane) on the other side face A2.

Via a longitudinally extending reinforcing structure V1, a continuous reinforcement at the assembly carrier AGT thus is also achieved via a plurality of surface segments F1 to F5 succeeding each other along the direction of longitudinal extension L of the reinforcing structure V1, which are offset to each other transversely to the support plane defined by the assembly carrier AGT and thus extend along different imaginary planes or levels relative to the support plane. On a side face A2, the reinforcing structure V1 is represented as a combination of a bead S and at least one reinforcing rib 23, 24, in order to achieve a continuous reinforcing measure at the change of planes.

In one development it is also possible that—alternatively or in addition to an increase of the reinforcing structure V1 on the second side face A2 transversely to the support plane—the dimensions and hence the expansion of the reinforcing structure V1 transversely to the direction of (longitudinal) extension L and along the support plane are increased, when the expansion of the reinforcing structure V1 decreases or must decrease on the other, first side face A1. Consequently, for example the width of the reinforcing ribs 23, 24 on the second side face A2 is increased, when the height of the portion of the reinforcing structure V1 protruding on the first side face A1 is reduced. On the one, second side face A2 an increase of the width of the reinforcing ribs 23, 24 (and hence an increase of the expansion of the reinforcing structure V1 transversely to the direction of longitudinal extension L) tends to be effected to the extent in which the expansion of the raised protruding portion of the reinforcing structure V1 on the other, first side face A1 decreases transversely to the support plane, in order to achieve a substantially constant reinforcing effect of the reinforcing structure V1 along its direction of longitudinal extension L. A decreasing expansion transversely to the support plane (xz-plane) on the one side face A1 thus is compensated by an increasing expansion transversely to the direction of extension L on the other side face A2.

The invention claimed is:

1. A support component for a motor vehicle which defines a support plane and defines two opposed side faces for an arrangement of functional components of a motor vehicle window lifter, wherein the support component includes at least one reinforcing structure for reinforcing the support component, which on both a first and a second side face extends along the support plane and along a direction of extension, wherein the support component forms at least two surface segments which on both the first and second side faces are arranged in the direction of extension of the reinforcing structure along the support plane, wherein the reinforcing structure is formed such that, on the first side face, the reinforcing structure extends in a manner protruding with respect to both surface segments transversely to the support plane (xz-plane) and, on the second side face, extends in a manner set back with respect to one surface segment of the at least two surface segments and protruding with respect to another surface segment of the at least two surface segments.

2. The support component according to claim 1, wherein an expansion of the reinforcing structure changes along the direction of extension of the reinforcing structure transversely to the support plane (xz-plane) defined by the support component.

3. The support component according to claim 2, wherein the expansion changes continuously along the direction of extension of the reinforcing structure.

4. The support component according to claim 2, wherein the reinforcing structure extends in a ramp-like manner at least in a portion.

5. The support component according to claim 2, wherein the expansion of the reinforcing structure on both the first and second side faces changes along the direction of extension of the reinforcing structure.

6. The support component according to claim 5, wherein the expansion of the reinforcing structure changes on one of the first and second side faces transversely to the support plane (xz-plane) and on the other one of the first and second side faces transversely to at least one of the support plane (xz-plane) and the direction of extension of the reinforcing structure.

7. The support component according to claim 6, wherein on both the first and second side faces the expansion of the reinforcing structure transversely to the support plane (xz-plane) and along the direction of extension of the reinforcing structure changes in a corresponding manner, so that an expansion of the reinforcing structure transversely to the support plane (xz-plane) decreases or increases on one of the first and second side faces to the extent in which the reinforcing structure's expansion transversely to the support plane (xz-plane) also decreases or increases on the other one of the first and second side faces.

8. The support component according to claim 6, wherein the expansion of the reinforcing structure on one of the first and second side faces changes transversely to the support plane (xz-plane) and on the other one of the first and second side faces changes transversely to the direction of extension of the reinforcing structure, so that a decreasing expansion transversely to the support plane (xz-plane) on the one side face is compensated by an increasing expansion transversely to the direction of extension of the reinforcing structure on the other side face.

9. The support component according to claim 1, wherein the reinforcing structure on at least one of the first and second side faces is formed by a bead and at least one reinforcing rib being arranged adjacent to the bead in the direction of extension of the reinforcing structure.

10. The support component according to claim 1, wherein along the direction of extension the reinforcing structure continuously protrudes from the first side face in a relief-like manner.

11. The support component according to claim 1, wherein the at least two surface segments are connected with each other via a further, third surface segment, across which the reinforcing structure extends.

12. The support component according to claim 1, wherein the at least two surface segments are arranged one behind the other and offset to each other in the direction of extension of the reinforcing structure along the support plane (xz-plane) and on both the first and second side faces the reinforcing structure at least partly extends over the two surface segments.

13. The support component according to claim 11, the third surface segment extends with an inclination to at least one of the at least two other surface segments and the support plane.

14. The support component according to claim 1, wherein the support component is configured for a motor vehicle door.

* * * * *